United States Patent
Wolff et al.

(10) Patent No.: US 7,337,693 B2
(45) Date of Patent: Mar. 4, 2008

(54) ACTUATING LEVER

(75) Inventors: Martin Wolff, Hattingen (DE); Johann-Georg Werner, Hamm (DE)

(73) Assignee: Johnson Controls GmbH, Burscheid (DE)

( * ) Notice: Subject to any disclaimer, the term of this patent is extended or adjusted under 35 U.S.C. 154(b) by 245 days.

(21) Appl. No.: 10/507,860

(22) PCT Filed: Mar. 14, 2003

(86) PCT No.: PCT/EP03/02694
§ 371 (c)(1),
(2), (4) Date: Mar. 25, 2005

(87) PCT Pub. No.: WO03/078202
PCT Pub. Date: Sep. 25, 2003

(65) Prior Publication Data
US 2005/0160872 A1  Jul. 28, 2005

(30) Foreign Application Priority Data
Mar. 15, 2002  (DE) ................. 102 11 662

(51) Int. Cl.
*G05G 1/04* (2006.01)
*G05G 1/10* (2006.01)

(52) U.S. Cl. .......................... 74/523; 74/543

(58) Field of Classification Search .......... 74/523, 74/502.2, 543; 403/79; 297/411.35; 248/289.11; G05G 1/04, 1/10
See application file for complete search history.

(56) References Cited

U.S. PATENT DOCUMENTS

| | | | |
|---|---|---|---|
| 3,803,941 A * | 4/1974 | Yoshikawa | 74/523 |
| 3,833,965 A | 9/1974 | Hess | |
| 5,123,296 A * | 6/1992 | Chang | 74/502.2 |
| 6,357,955 B1 * | 3/2002 | Hoffmann et al. | 403/79 |
| 6,767,065 B2 | 7/2004 | Heranney | |
| 2002/0175254 A1 * | 11/2002 | Lee | 248/289.11 |
| 2004/0090104 A1 * | 5/2004 | Seibold | 297/411.35 |

FOREIGN PATENT DOCUMENTS

| | | |
|---|---|---|
| DE | 33 23 539 A1 | 1/1985 |
| EP | 0 748 963 A1 | 12/1996 |
| FR | 2 750 185 A1 | 12/1997 |

OTHER PUBLICATIONS

Standard Handbook of Machine Design, Joseph E. Shigley and Charles R. Mischke, McGraw-Hill Book, Co., 1986, pp. 22.1-22.17.*
PlasticsNet, plasticsnet.com/content/productshowcase/product.asp?docid=1ab69bae-4585-1, 1996-2007.*
Plastic, en.wikipedia.org/wiki/Plastic, Mar. 2007.*
Acrylonitrile butadiene styrene, en.wikipedia.org/wiki/Acrylonitrile-butadiene-styrene, Mar. 18, 2007.*

* cited by examiner

*Primary Examiner*—Vinh T. Luong
(74) *Attorney, Agent, or Firm*—Foley & Lardner LLP

(57) ABSTRACT

An actuating lever (1), in particular for adjusting a vehicle seat, has an axle receptacle (2), an articulation device (4) for force delivery and a grip piece (3). The actuating lever (1) is manufactured in one piece from plastic, a core (5) which comprises the axle receptacle (2) and the articulation device (4) is manufactured from a material having higher strength than the grip piece (3).

2 Claims, 1 Drawing Sheet

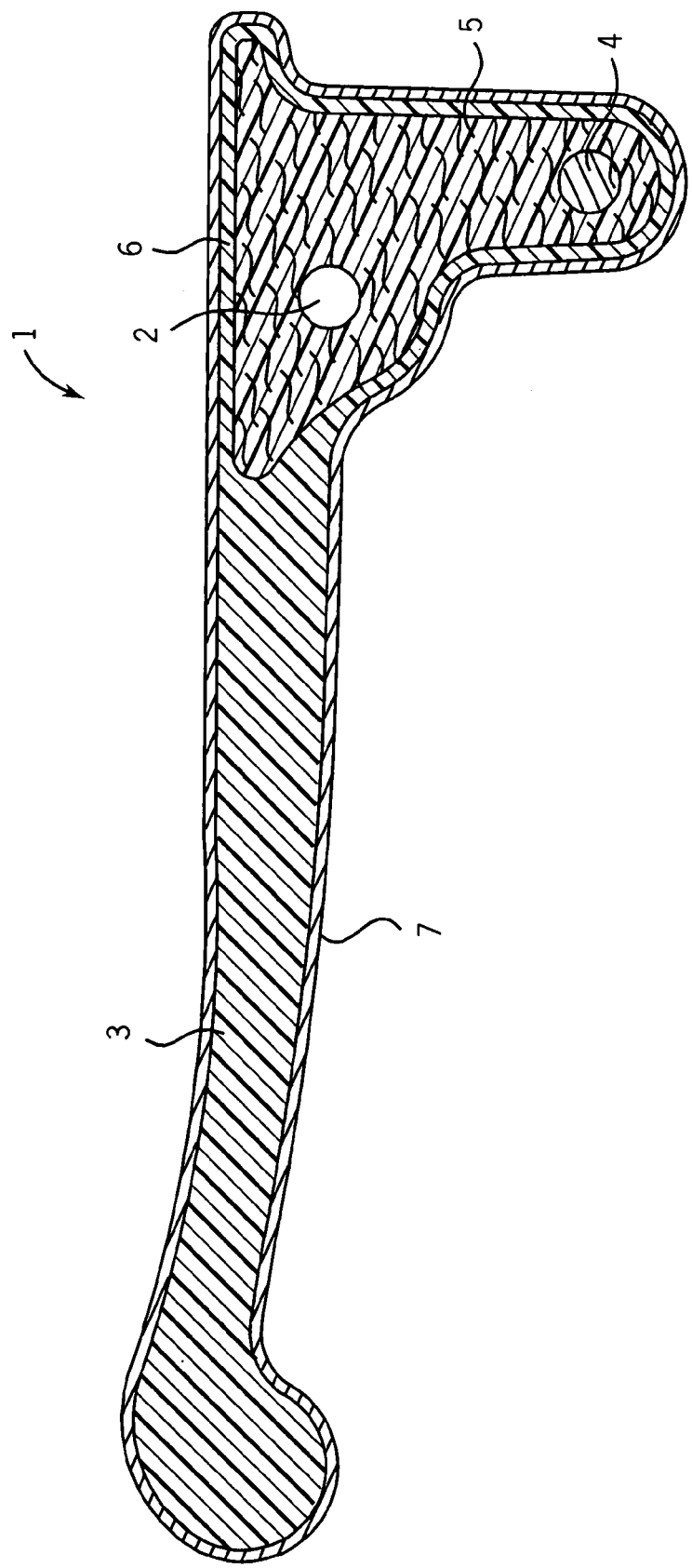

ACTUATING LEVER

CROSS REFERENCE TO RELATED APPLICATIONS

The present application incorporates by reference and claims priority to the following application: German Patent Application Serial Number 102 11 662.8, filed Mar. 15, 2002, and International Patent Application Serial Number PCT/EP03/02694, filed Mar. 14, 2003.

BACKGROUND OF THE INVENTION

The invention relates to an actuating lever, in particular for adjusting a vehicle seat, with an axle receptacle, with an articulation device for force delivery and with a grip piece.

Generic actuating levers are known from practice and serve, for example for releasing the locking device of a seat length or seat height adjuster. In this case, when the grip piece is pulled or pressed, the lever pivots about an axis of rotation and displaces an articulation device for force delivery, located in the lever, in particular a lug suitable for receiving a bolt. This lug can be in interaction with the locking device via a linkage or a Bowden cable, so that displacement of the articulation device brought about by the operation of the grip piece is transmitted to the locking device and releases the latter.

Highly loaded actuating levers of this type are conventionally produced either from a pressed and stamped steel sheet, if appropriate in conjunction with a grip piece bent from round material and welded on, or by means of metal diecasting.

The first-mentioned levers are extremely cost-effective to manufacture, but may not satisfy stringent demands in terms of the configuration possibilities. Although it is possible, in a diecasting method, to produce high-strength actuating levers of complex geometry which can be additionally chromium-plated for a further improvement in visual appearance, these levers are nevertheless relatively heavy and are therefore inclined, because of their mass inertia, in an accident situation to release the adjustment device unintentionally due to the acceleration forces acting on them. It is therefore necessary always to act upon these actuating levers with a relatively high springforce directed opposite to the release direction. This makes intended release more difficult and, furthermore, increases the cost of the lever mechanism.

The object on which the invention is based is to provide a lightweight, high-strength actuating lever which meets high requirements as to dimensional configuration and surface quality.

SUMMARY OF THE INVENTION

The object is achieved, according to the invention, in that the actuating lever is manufactured in one piece from plastic, a core which comprises the axle receptacle and the articulation device being manufactured from a material of higher strength than the grip piece, the length of the grip piece preferably being greater than the distance between the axle receptacle and the articulation device.

A visually especially sophisticated actuating lever can be produced in that the material of the grip piece essentially encases the core consisting of higher-strength material. The core is advantageously manufactured from a fiber-reinforced plastic, in particular from a glass-fiber-reinforced styrene-acrylonitrile (SAN), while the material of the grip piece consists of a polycarbonate compound, in particular of an unreinforced polycarbonate acrylobutadiene styrene (PC-ABS) compound. The last-mentioned material can be processed with high surface quality, so that it can be covered with a high-grade chromium layer.

The production of the actuating lever according to the invention is preferably carried out by injection molding, in particular by the monosandwich method. In this, two melts are first layered in succession in a common worm cylinder, the second melt being plasticized via a secondary extruder into the worm cylinder of the main assembly. The injection operation then takes place in a similar way to conventional injection molding with only a single stroke. The sandwich structures occur due to the flow properties of the axially layered melts in the worm cylinder. The material injected first is in this case laid onto the wall of the die cavity, while the material injected subsequently forms the core.

BRIEF DESCRIPTION OF THE FIGURE

The FIGURE illustrates diagrammatically, by way of example, a longitudinal section through an embodiment of the invention.

DESCRIPTION

The actuating lever 1 is provided with an axle receptacle 2, from which a first lever arm forming a grip piece 3 extends forward and a second lever arm equipped with an articulation device 4 in the form of a lug extends downward at right angles to the first lever arm. The length of the grip piece 3 is in this case considerably greater than the distance between the axle receptacle 2 and the articulation device 4, so that the forces introduced into the grip piece at the end face are intensified. The region between the receptacle axle 2 and the articulation device 4 is therefore subjected to a substantially higher load in mechanical terms than the remaining part of the actuating lever 1.

In order to meet these requirements, the core 5 connecting the axle receptacle 2 and the articulation device 4 consists of a glass-fiber reinforced styrene acrylonitrile (SAN) which has a glass fiber fraction of at least 20%, but preferably about 35%. Even under load at a comparatively high temperature of 80% C, this material possesses considerable strength, but it has only an unsatisfactory surface.

The core 5 is therefore provided with a casing 6 made from the material of the grip piece 3 which consists of an acrylobutadiene styrene (PC-ABS) compound. This material has sufficient strength, in terms of the forces occurring in the grip piece 3, even under relatively high temperatures, but, because of its high surface quality, allows the application of a chromium layer 7 which completely surrounds the actuating lever. Experience shows that, even slight unevenness of the base, for example structures of a fiber reinforcement, stand out in the chromium layer 7. Furthermore, manufacture by the monosandwich method avoids the situation where the die cavity is opened during manufacture. The surface quality of the actuating lever is therefore sufficiently good, even in the region of the parting edges, so that remachining is not necessary.

The actuating lever according to the invention can advantageously be used not only for releasing a seat adjustment, but, furthermore, also in all fields of use wherever a low weight in conjunction with a high-quality visual appearance is required, particularly in the equipping of vehicle interiors. Thus, an actuating lever of this type may also be used as an interior-side door opener or for the opening of glove compartments or the like.

What is claimed is:

1. An actuating lever, for adjusting a vehicle seat, comprising:

an axle receptacle with an articulation device for force delivery;

and a grip piece manufactured in one piece from plastic having a core which comprises the axle receptacle and wherein the articulation device is manufactured from a material of higher strength than the grip piece, wherein the length of the grip piece is greater than the distance between the axle receptacle and the articulation device, and wherein the material of the grip piece substantially encases the core, the core consisting of a relatively higher-strength material consisting of a fiber-reinforced plastic including a glass-fiber-reinforced styrene acrylonitrile, wherein the material of the grip piece consists of a polycarbonate compound including an unreinforced polycarbonate acrylobutadiene styrene compound, and, wherein the material of the grip piece is covered with a chromium layer.

2. The actuating lever as claimed in claim 1, produced by injection molding utilizing a monosandwich method.

* * * * *